United States Patent [19]

Shiau

[11] Patent Number: 5,196,942
[45] Date of Patent: Mar. 23, 1993

[54] SYSTEM AND METHOD FOR DETERMINING PICTURE ELEMENT VALUES

[75] Inventor: Jeng-Nan Shiau, Webster, N.Y.

[73] Assignee: Xerox Corporation, Stamford, Conn.

[21] Appl. No.: 583,337

[22] Filed: Sep. 17, 1990

[51] Int. Cl.⁵ .............................................. H04N 1/40
[52] U.S. Cl. .................................. 358/298; 358/447; 358/457; 358/465
[58] Field of Search ............... 358/248, 443, 457, 465, 358/466, 445, 447

[56] References Cited

U.S. PATENT DOCUMENTS

| | | | |
|---|---|---|---|
| 3,739,084 | 6/1973 | Heinrich | 358/465 X |
| 4,196,454 | 4/1980 | Warren | 358/298 X |
| 4,366,507 | 12/1982 | Mori | 358/283 |
| 4,547,811 | 10/1985 | Ochi et al. | 358/466 X |
| 4,638,373 | 1/1987 | Logan | 358/298 |
| 4,651,287 | 3/1987 | Tsao | 358/75 X |
| 4,668,995 | 5/1987 | Chen et al. | 358/283 X |
| 4,680,645 | 7/1987 | Dispoto et al. | 358/298 |
| 4,710,822 | 12/1987 | Matsunawa | 358/466 |
| 4,736,254 | 4/1988 | Kotera et al. | 358/298 X |
| 4,868,587 | 9/1989 | Loce et al. | 346/160 X |
| 4,924,322 | 5/1990 | Kurosawa et al. | 358/457 X |

OTHER PUBLICATIONS

Gerald Goertzel et al., "Digital Halftoning on the IBM 4250 Printer," IBM J. Res. Develop. vol. 31, No. 1, Jan. 1987.
C. Billotet-Hoffmann et al., "On the Error Diffusion Technique for Electronic Halftoning," Proceedings of the SID, vol. 24/3, pp. 253-258, (1983).
Robert W. Floyd et al., "An Adoptive Algorithm for Spatial Gray Scale".

Primary Examiner—Benjamin R. Fuller
Assistant Examiner—Eric Frahm
Attorney, Agent, or Firm—Finnegan, Henderson, Farabow, Garrett & Dunner

[57] ABSTRACT

A method of reproducing gray levels on a device capable of displaying a limited number of gray levels. A system is disclosed for partitioning an image composed of pixels into halftone cells, each having multiple pixels. Each input pixel value within a halftone cell is translated into an output pixel value in accordance with a set of threshold arrays.

9 Claims, 10 Drawing Sheets

FIG. 2
PRIOR ART

| 48 | 40 | 12 | 4  |
|----|----|----|----|
| 36 | 56 | 63 | 20 |
| 24 | 52 | 60 | 28 |
| 8  | 16 | 32 | 44 |

FIG. 3
PRIOR ART

| 49 | 49 | 49 | 49 |
|----|----|----|----|
| 49 | 49 | 49 | 49 |
| 49 | 49 | 49 | 49 |
| 49 | 49 | 49 | 49 |

FIG. 4
PRIOR ART

| 0 | 0 | 0 | 0 |
|---|---|---|---|
| 0 | 1 | 1 | 0 |
| 0 | 1 | 1 | 0 |
| 0 | 0 | 0 | 0 |

PICTURE ELEMENTS AND 2 BY 4 HALFTONE BLOCKS OF A 45 DEGREE SCREEN

WHITE

| ARRAY A | 244 | 117 | 85 | 149 |
|---|---|---|---|---|
| | 212 | 21 | 53 | 181 |

LIGHT GRAY

| ARRAY B | 234 | 106 | 74 | 138 |
|---|---|---|---|---|
| | 202 | 11 | 43 | 170 |

DARK GRAY

| ARRAY C | 223 | 96 | 64 | 128 |
|---|---|---|---|---|
| | 191 | 0 | 32 | 159 |

BLACK

THE 2 BY 4 THRESHOLD ARRAY VALUES FOR AN OUTPUT DEVICE CAPABLE OF SHOWING BLACK, DARK GRAY, LIGHT GRAY AND WHITE

*FIG. 8*

THE DOT PATTERN CORRESPONDING TO THE CALIBRATING GRAY LEVELS.

ERROR PROPAGATION BETWEEN ADJACENT BLOCKS

SYSTEM AND METHOD FOR DETERMINING PICTURE ELEMENT VALUES

BACKGROUND OF THE INVENTION

1. Field of the Invention

The invention relates to system and method of reproducing an image, and more particularly to a system and method of reproducing an image having a large number of intensity levels, on a device capable of producing a limited number of intensity levels.

2. Description of the Related Art

Many image reproduction systems do not render faithful or pleasing reproductions of continuous tone originals. For example, in many developable image copiers, the typical discharge characteristic of the photoconductor and solid area developability of the image development system combine to yield a Tone Reproduction Curve (TRC) with a steep slope and a narrow range. The result is a copy with washed out highlights and overdeveloped shadows. A standard method used to improve the gray scale reproduction is to expose the photoconductor through a transmissive screen to produce a fine, spatially modulated voltage pattern on the photoconductor. Development of this modulated pattern yields a Tone Reproduction Curve with a lower slope and an extended range of input gray scale that produces a corresponding change in the output. The result is more faithful and pleasing copy.

FIG 1. shows another method of presenting gray levels to the viewer in a typical reproduction system. The image to be reproduced is partitioned into mutually exclusive areas called "halftone cells," each containing a number of pixels. The size of the sample area of the input section of the reproduction system corresponds to a halftone cell, while the size of the printing area in the output section of the typical reproduction system corresponds to a pixel. Gray levels are simulated by turning on a subset of the total number of pixels in a halftone cell in an output section of the reproduction system. The pixels are too small for the viewer to perceive the printing of individual pixels, and the viewer instead perceives a gray level corresponding to the percentage of pixels that are turned on.

FIG. 1 shows seventeen different halftone cells corresponding to the range of gray levels between black (0) and white (16). To print black no pixels in the halftone cell are turned on as shown at portion 105 in FIG. 1. To simulate an intermediate level of gray for the printing of a certain cell, half the pixels might be turned on as shown at level eight, portion 110 in FIG. 1.

A fundamental drawback of the scheme illustrated in FIG. 1 is a trade-off that exists between the number of gray levels and resolution. Since the area of the input sample is not the area of printing resolution, a pixel, but is instead the larger halftone cell area, resolution is reduced. Reducing the size of the halftone cell to include fewer pixels will increase resolution while reducing the number of gray levels. Halftone methods employed in developable image printers have traditionally been binary, that is, the laser writes with only two laser intensity levels; on and off.

U.S. Pat. No. 4,196,454 discloses a method of halftoning that tends to enhance the resolution of edges in the reproduced image, given a certain halftone cell size. FIG. 2 shows a halftone cell portioned into areas corresponding to the pixels of the cell with each area having an associated intensity threshold value. In operation, where the pixel input intensity is equal to or above the screen threshold value for a given pixel position, a binary 0 output results. Where the pixel voltage level is below the screen threshold value, a binary 1 output results. This operation is shown in FIGS. 3 and 4. FIG. 3 is an exemplary input cell where the pixels each happen to have a corresponding intensity value of 49 FIG. 4 is the binary output pattern resulting from the processing of the pixels in FIG. 3 with the thresholds shown in FIG. 2. This method of processing is sometimes called "binary screening."

U.S. Pat. No. 4,868,587 discloses a system for increasing the number of gray levels given a certain halftone cell size. In U.S. Pat. No. 4,868,587, the average value of the input pixel intensities is used to access a lookup table to select an appropriate halftone cell to be printed. Where it is desired to preserve image microstructure such as edges to enhance resolution, pixels within the halftone cell are rearranged during processing so as to best correspond to the position of the original pixels in the cell of pixels being processed. White pixels in the selected halftone cell selected are relocated to match the location of the whitest pixel in the input halftone cell, black pixels in the selected halftone cell are relocated to match the location of the blackest pixel in the input halftone cell, light gray pixels in the selected halftone cell are relocated to match the location of the light gray pixels in the input halftone cell, etc.

SUMMARY OF THE INVENTION

It is an object of the present invention to both enhance the number of perceived gray levels and while preserving resolution, given a certain halftone cell size.

It is an additional object of the present invention to provide for the preservation of image microstructure such as edges, without requiring a rearrangement of the pixels in a halftone cell during processing.

To achieve these objects and other advantages of the present invention, in an image processing system having an input section for generating input image data having multiple input pixels, each input pixel having an input intensity value, being one of a set of input intensity values, corresponding to the intensity of a sampled area of the image, and an output section for reproducing the pixels at one of an output set of intensity values, the size of the set of output intensity values being smaller than the size of the set of input intensity values, a method of processing the pixel data generated by the input section in accordance with a plurality of threshold arrays comprising the steps, performed by a processor, of partitioning the input image data into cells having a plurality of pixels, the dimensions of each cell corresponding to the dimension of the threshold arrays and each pixel of each cell corresponding to one threshold in each threshold array; processing each cell including the substeps, performed for each pixel in a cell, of translating the input intensity value into one of the set of output intensity values, in accordance with the plurality of threshold arrays, to produce an output intensity value; and applying the output intensity value to the output section. The size of a set of intensity values is defined to be the number of intensity values in the set.

The accompanying drawings which are incorporated in and which constitute a part of this specification, illustrate one embodiment of the invention and, together with the description, explain the principles of the invention, and additional advantages thereof.

BRIEF DESCRIPTION OF THE DRAWINGS

FIG. 2 is a threshold array corresponding to a prior art method of simulating gray levels.

FIG. 3 is an example of a pattern of input pixel intensities.

FIG. 4 is the result of processing the pixels of FIG. 3 according to the thresholds of FIG. 2.

FIG. 8 shows a set of threshold arrays in a halftone cell according to the preferred embodiment of the invention.

DESCRIPTION OF THE PREFERRED EMBODIMENT

Figure 1:
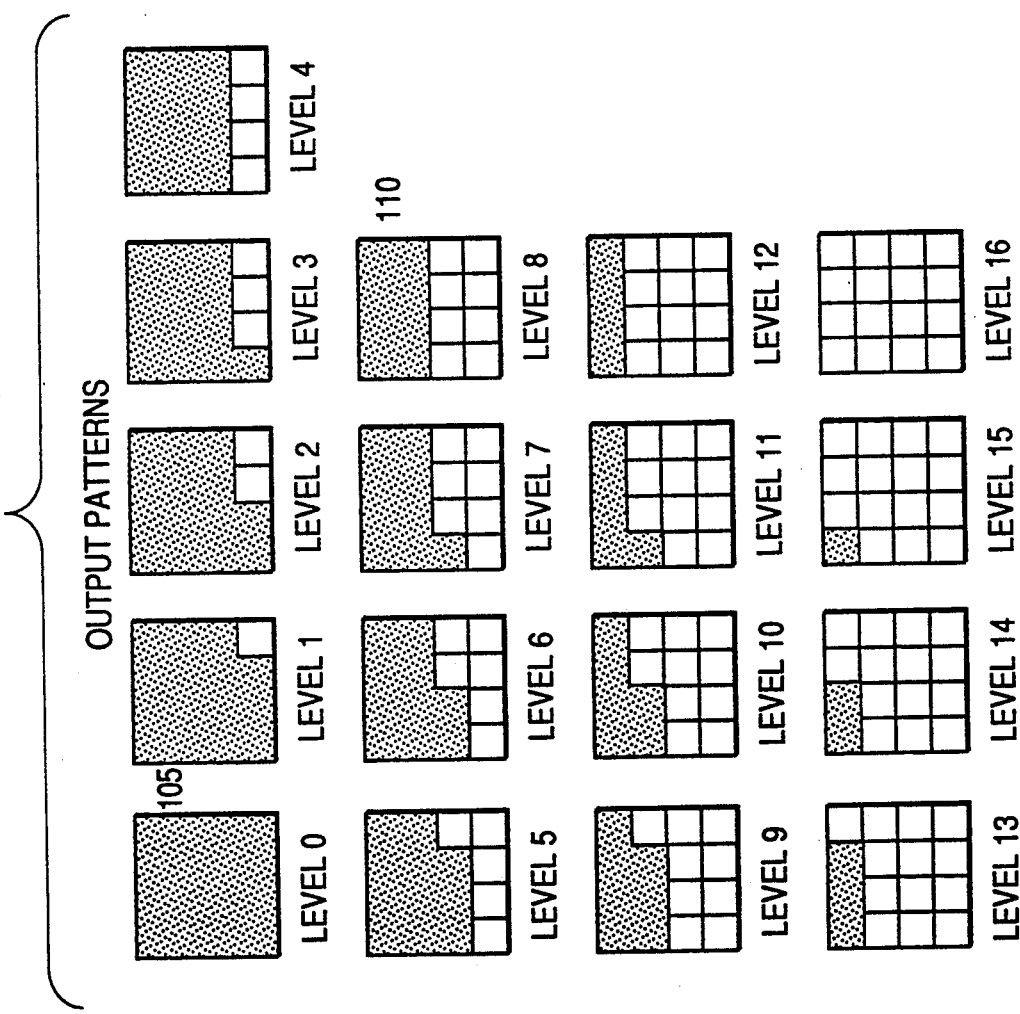
FIG. 1 is a chart illustrating a prior art method of simulating gray levels.
Figure 5:
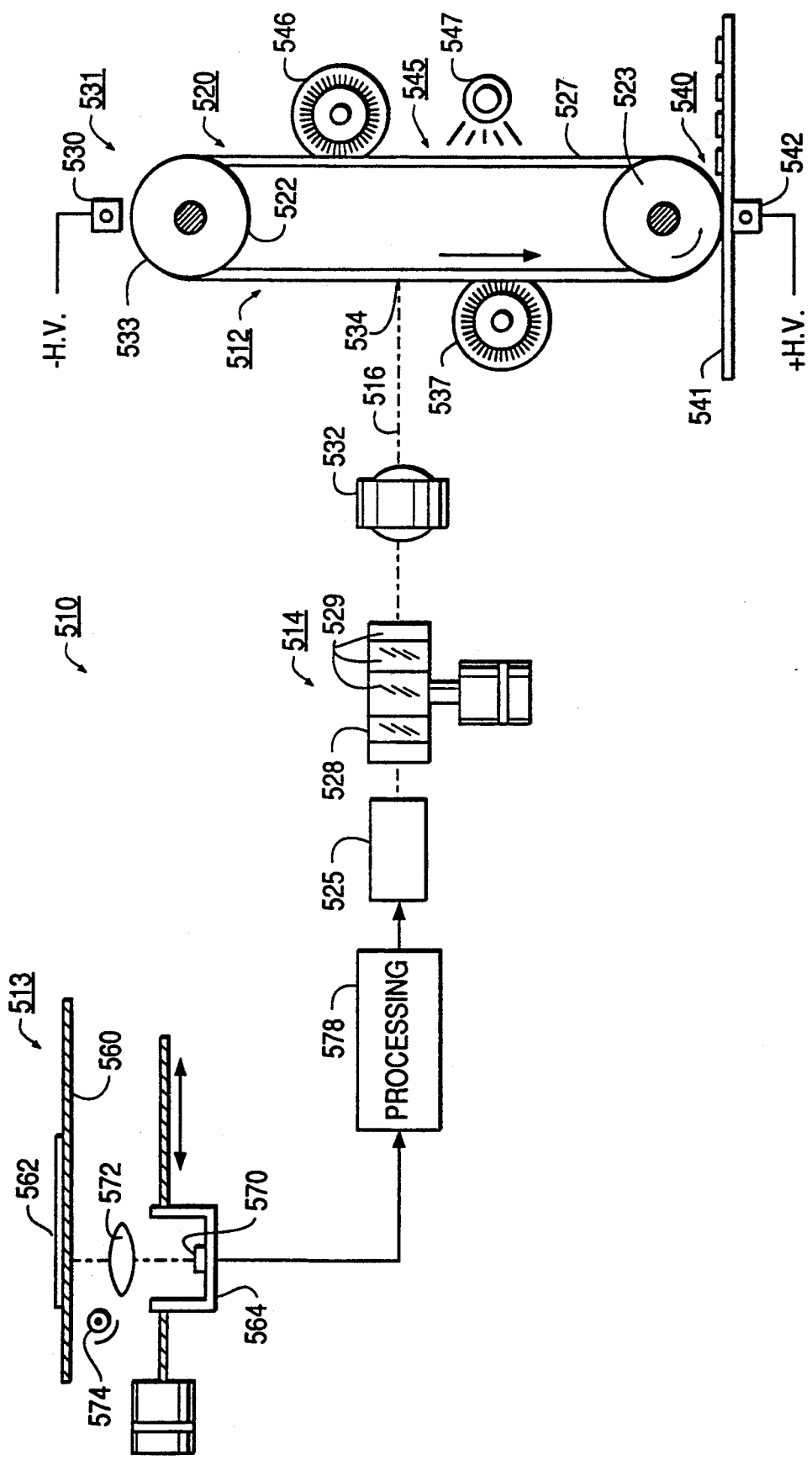
FIG. 5 is a schematic view of an example of a printer for which the gray level system according to the preferred embodiment of the invention is intended, and into which it is illustratively incorporated.
Figure 6:
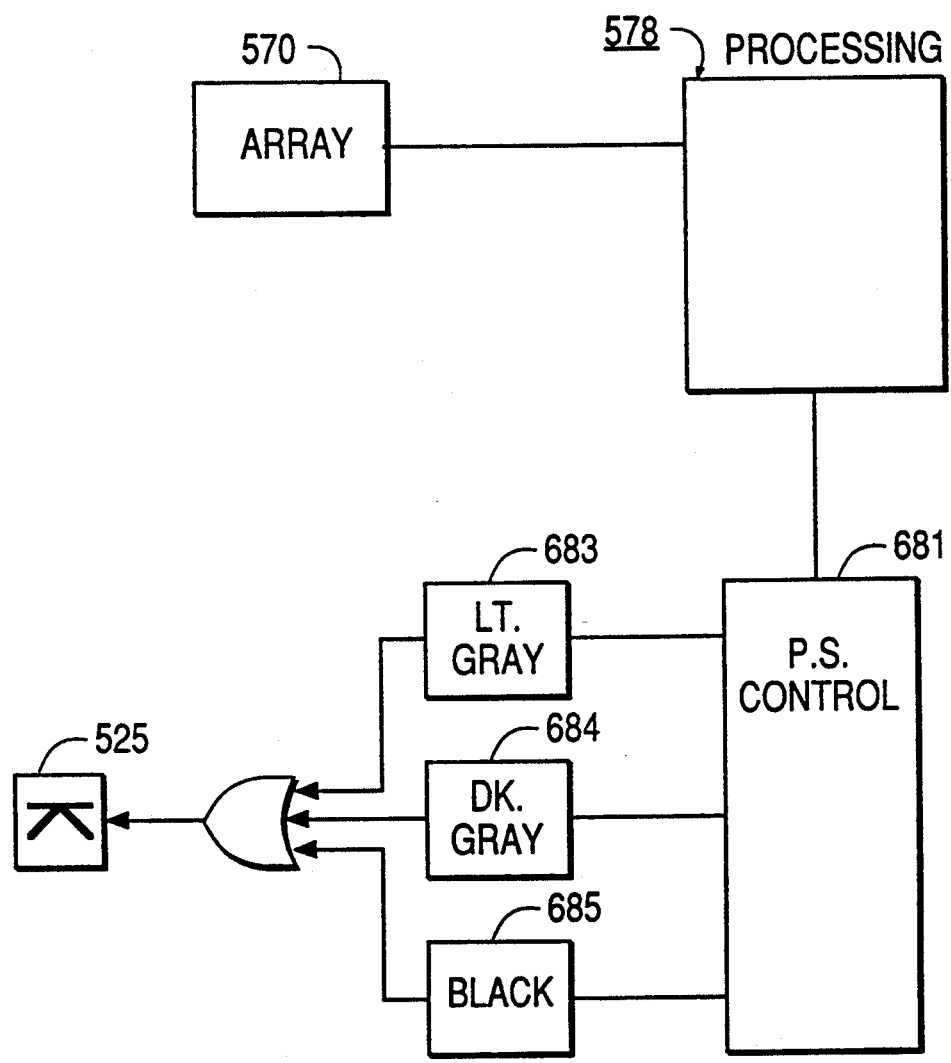
FIG. 6 is a schematic view of a section of FIG. 5 in more detail.

FIGS. 5 and 6 show an exemplary electronic printer 510 incorporating the halftone system according to the preferred embodiment of the present invention. Printer 510 includes a developable image processing section 512, a document scanning section 513, and an image printing section 514, the latter including a variable intensity imaging beam of light 516 for scanning across photoreceptor 520 of section 512 to provide four level exposure for printing.

Processing section 512 includes a photoreceptor 520 illustrated herein in the form of an endless belt 520 stretched across drive and idler belt support rollers 522, 523 respectively on which latent electrostatic images representative of the image signal input are created. Belt supporting rollers 522, 523 are rotatably mounted in predetermined fixed positions by suitable means (not shown). Roller 523 is driven from a suitable drive motor (not shown) to move photoreceptor 520 in the direction shown by the solid line arrow. While photoreceptor 520 is illustrated in the form of an endless belt, other photoreceptor configurations such as a drum may be envisioned.

Photoreceptor 520 comprises an inner layer or substrate of a suitable flexible electrically conductive substrate with an outer photoconductive layer 527 such as selenium thereupon. Photoreceptor 520 may be opaque, that is, impervious to light or wholly or partially transparent. An exemplary photoreceptor 520 typically has an aluminum substrate which renders the photoreceptor opaque. However, other substrate materials such as glass, may be contemplated which would render photoreceptor 520 wholly or partially transparent. Materials for photoconductive layer 520 other than selenium as, for example, organic, may also be contemplated. One organic type material, for example, consists of an aluminized Mylar substrate having a layer of selenium dispersed in poly-N-vinyl carbazole with a transparent polymer overcoating containing a charge transport compound such as pyrene.

A corona charging device 530 commonly known as a corotron is operatively disposed adjacent photoreceptor 520 at charging station 531. Corotron 530 which is coupled to a suitable negative high voltage source ($-Hv$) serves to place a uniform negative charge on photoreceptor 520 in preparation for imaging.

Imaging beam 516 of image printing section 514 is incident on photoreceptor 520 at exposure point 534. Imaging beam 516 is derived from an individual self modulated I.R. diode laser 525, the intensity of beam 516 being at one of three possible levels in the quaternary system described. Beam 516 is swept across photoreceptor 520 transverse to the indicated direction of motion by a rotating polygon 528. A suitable lens 532 focuses beam 516 onto photoreceptor 520.

A development subsystem 537 exemplified herein by a magnetic brush roll, is disposed in operative contact with photoreceptor 520 downstream of the contact point 534 of imaging beam 516. Development subsystem 537 includes a suitable developer housing (not shown) within which a supply of developer is provided together with means for loading the developer onto the development subsystem's magnetic brush roll.

The development subsystem preferably comprises a non-scavenging development system using a mono-component developer, the mono-component developer being a relatively small colorant material (referred to as toner). Due to electrostatic forces, the toner is drawn to the latent electrostatic image formed on photoreceptor 520 by imaging beam 516 in proportion to the latent image charge level to develop the image. In the present arrangement, a discharge development system is used herein, following negative charging of photoreceptor 520 by corotron 530, image areas are discharged by beam 516 in accordance with image signals. The developing toner is negatively charged and is therefore attracted to the discharged image areas while being repelled from the un-discharged areas.

As will be understood, in the development subsystem of this type, when the intensity of beam 516 is at a maximum, maximum development occurs and a black pixel is obtained. When beam 516 is turned off, no development occurs and a white pixel is obtained. In the halftone system described, two intermediate gray pixel levels are required. These are obtained by providing two intermediate beam intensity levels so that corresponding intermediate amounts of development take place to provide predetermined light gray and dark gray pixels respectively.

Following development of the latent electrostatic image on photoreceptor 520 by developing subsystem 537, the developed image is transferred to a suitable copy or print substrate material 541 such as paper at transfer station 540. To facilitate transfer, a transfer corotron 542 which is coupled to a high voltage power source ($+Hv$) is provided to attract the developed image on photoreceptor 520 to copy substrate material 541. Following transfer, the developed image is fixed by fusing. Any residual charges and/or developing material left on photoreceptor 520 are removed at cleaning station 545 by erase lamp 547 and cleaning brush 546 respectively.

At document scanning section 513 of printer 510, image data in the form of electrical signals representative of the document image intensities are generated. In the exemplary arrangement shown, document scanning section 513 includes a transparent platen 560 on which a document 562 bearing the image to be processed and printed is placed, either manually or by means of an automatic document handler (not shown). A suitable carriage 564, supported for reciprocating back and forth movement below platen 560, has one or more linear scanning arrays, identified as array 570, mounted thereon. Array 570 may comprise any suitable scanning array type as, for example, a CCD. Carriage 564 is driven by a suitable reversible driver such as a step motor (not shown). Suitable optics, exemplified here by lens 572, focuses array 570 on a line of the image on document 562. A suitable lamp 574 illuminates the document line being scanned by array 570.

A system for electronic printers in which discrete combinations of either three or four intensity level pixels having optimal intermediate levels to form halftone cells to provide an increased number of gray levels for processing image data is disclosed in U.S. Pat. No. 4,868,587, the contents of which are herein incorporated by reference.

Array 570 converts each line of the document image viewed into a succession of analog image signals. The image signals are output to a processing section 578 where the signals are converted from analog to multi-bit digital image picture elements or pixels representing the document intensity levels. Processing section 578 supplies control signals to power supply control section 681, which in turn supplies control signals to power supplies 683, 684, and 685 (FIG. 6).

Power supplies 683, 684, 685 each provide different levels of power output for driving diode laser 525 to expose photoreceptor 520 and provide a latent electrostatic image in accordance with the image content of the image signal output of array 570. In the quaternary system disclosed, power supply 683 provides a first level power input to laser 525 to cause laser 525 to output a beam 516 at a first intensity level corresponding to light gray. Power supply 684 provides a second level power input to laser 525 to cause laser 525 to output a beam 516 at a second intensity level corresponding to dark gray. And, power supply 685 provides a third level power input to laser 525 to cause laser 525 to output a beam 516 at a third intensity level corresponding to black. It will be understood that exposure at the remaining fourth level, i.e., white, in the quaternary system disclosed herein is accomplished through the absence of a control signal to power supplies 683, 684, 685. In that event, diode 525 does not expose photoreceptor 520 at the point of development, so that the discharging is insufficient to cause developing by developer 537.

While separate power supplies 683, 684, 685 are shown, it will be understood that any suitable source of power for operating diode 525 at the various intensity levels described may be used.

In the system according to the preferred embodiment of the present invention, the number of average gray intensities (i.e., gray steps) of an image is significantly increased through the use of gray or intermediate level pixels. The system disclosed provides substantially more unique halftone cells than a binary system of the same cell size.

The intensity of the printed gray pixels may be controlled by several possible mechanisms. The method previously described varies the black dot size or toner pile height within the pixel. The density of a full individual pixel can also be varied by using a multi-development system in which both one or two gray toners and a black toner are provided for selective development.

It is presently preferred that processing section 578 be implemented with a special purpose image processing chip. The operation of processing section 578 will now be described. For simplicity of description of processing section 578, components of the system described earlier that apply data to processing section 578 may be visualized as an input section for generating input image data having multiple input pixels. Each input pixel has an input intensity value equal to one of a set of input intensity values. The input intensity value for a particular pixel corresponds to the intensity of a sampled area of the image.

The components of the system that receive the data from processing section 578 may be visualized as an output section for reproducing output pixels. Each output pixel has an output intensity value equal to one of a set of output intensity values. Because the system described above is capable of reproducing only a limited number of gray levels for each pixel, the size of the output set of intensity values is smaller than the size of the input set of intensity values being used.

Figure 7:
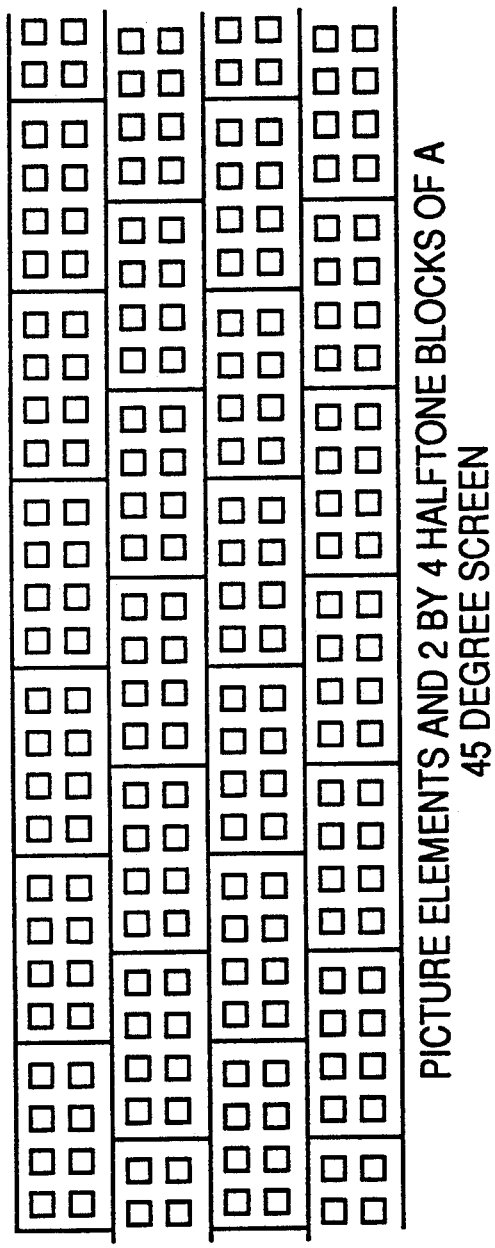
FIG. 7 is an arrangement of a 45° screen according to the preferred embodiment of the present invention.

As described earlier, processing section 578 partitions the input image data into a number of rows of cells having a plurality of pixels. FIG. 7 shows partition boundaries that form the cell arrangement employed in the preferred embodiments. In FIG. 7, it can be seen that the partition boundaries are aligned to form a so called 45° screen, have odd numbered rows of cells offset in the horizontal direction with respect to even numbered rows of cells by half a cell width. The 45° degree screen is preferable to a cell arrangement in which the cells are vertically aligned, because the viewer of a 45° screen is less likely to perceive the discrete structure of the halftone cells in an area of the image.

Processing section 578 determines an output intensity value for each pixel of a cell by comparing the sum of the pixel input intensity and an error term, to be described later, against a set of threshold arrays. FIG. 8 shows a set of three threshold arrays in accordance with the preferred embodiment. The dimensions of each threshold array are 2×4 corresponding to the dimensions of the halftone cell, with each pixel of each cell corresponding to a threshold in each threshold array.

Figure 9:
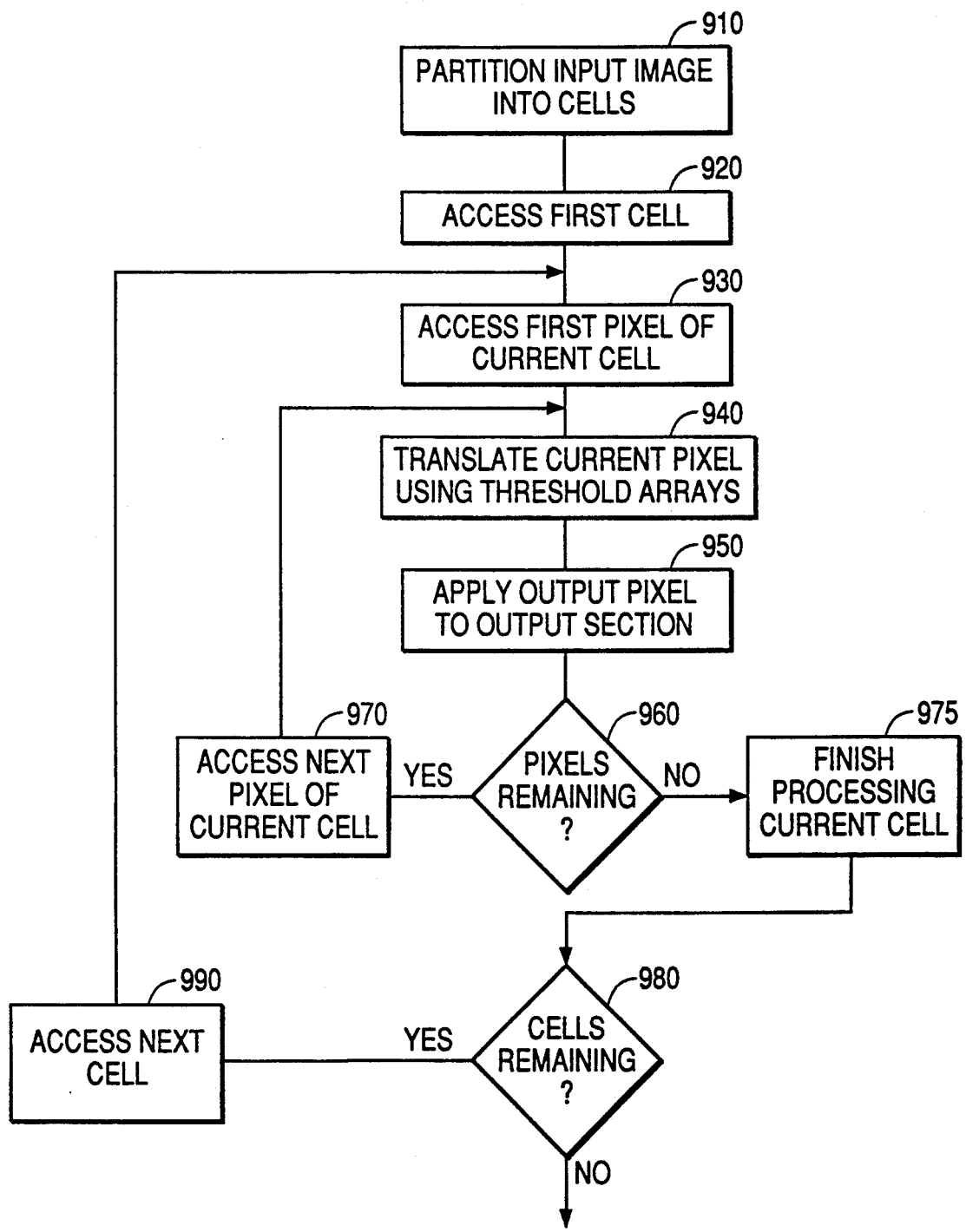
FIG. 9 is a general flow diagram of processing according to the preferred embodiment of the invention.

FIG. 9 shows an overview of the processing of processing section 578. An image to be processed is partitioned into halftone cells (step 910), and the first cell is accessed to be the currently processed cell (step 920). The first pixel of the current cell is accessed (step 930), and translated into an output pixel value in accordance with a set of threshold arrays (step 940). The resulting output pixel value is applied to the output section (step 950) and a check is performed to determine if pixels remain to be processed in the currently accessed cell (step 960). If pixels remain to be processed then the next pixel in the cell is accessed (step 970) and control passes to step 940. If no pixels remain to be processed, a check is performed to see if cells remain to be processed (step 980). If cells remain to be processed, the next cell is accessed (step 990) and control passes to step 930.

The 2×4 halftone cell illustrated in FIG. 7 would generate a screen frequency of 141 lines per inch on an output device of 400 spots per inch resolution. This screen frequency is sufficiently high for good quality spatial resolution. Because each halftone cell is capable of assuming only 24 gray levels, however, if the pixel values were to be translated to output pixel values based on, and only on, and the set of threshold arrays, a good overall quality reproduction would not necessarily result. To avoid the occurrence of false contouring or so called banding the gray level could be increased by using a bigger halftone cell such as a 3×6 or 4×8, but that would result in a decrease in screen frequency with a resulting decrease in spatial resolution. Instead, the preferred embodiment of the present invention employs an error diffusion technique to alleviate the problem of false contouring.

Figure 10:
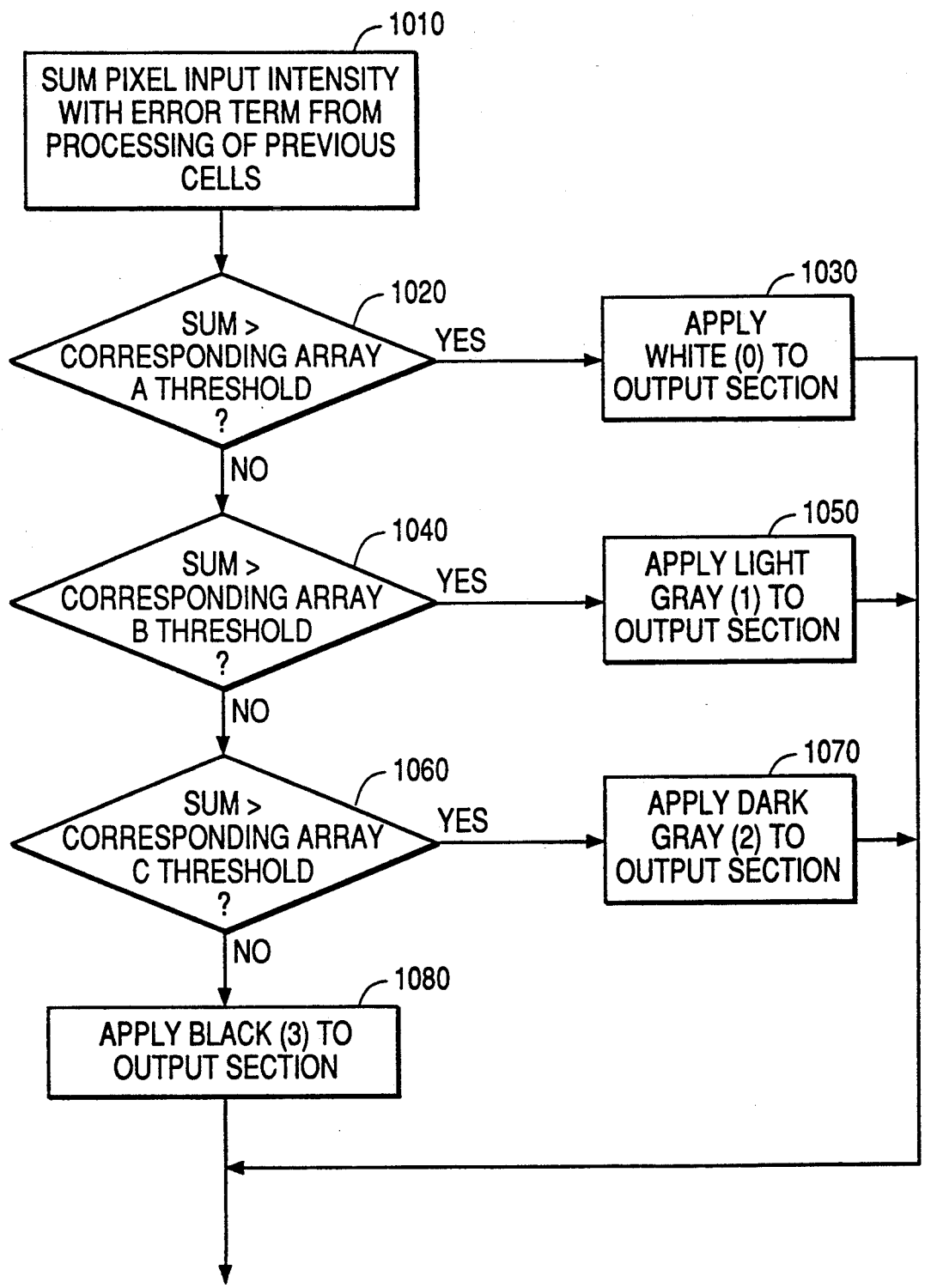
FIG. 10 is a flow diagram corresponding to one step of FIG. 9.

FIG. 10 shows a detailed flow diagram corresponding to step 940 in FIG. 9. First, the pixel input intensity is summed with an error term from the processing of previous cells (step 1010). This error term will be explained in detail later. A check is performed to determine whether the sum is greater than the corresponding threshold in threshold array A (step 1020) and an output value of white (0) is applied to the output section if the sum is greater than the corresponding threshold in threshold array A (1030). If the result of the previous determination is no, a check is performed to determine whether the sum is greater than the corresponding threshold in threshold array B (step 1040) and a value of light gray (1) is applied to the output section if the sum is greater than the corresponding threshold in threshold array B (1050). If the result of previous determination is no, a check is performed to determine whether the sum is greater than the corresponding threshold in threshold array C (step 1060) and a value of dark gray (2) is applied to the output section if the sum is greater than the corresponding threshold array C (step 1070). If the sum is not greater than all of the corresponding thresholds in the threshold arrays, an output of black (3) is applied to the output section (step 1080).

Figure 11:
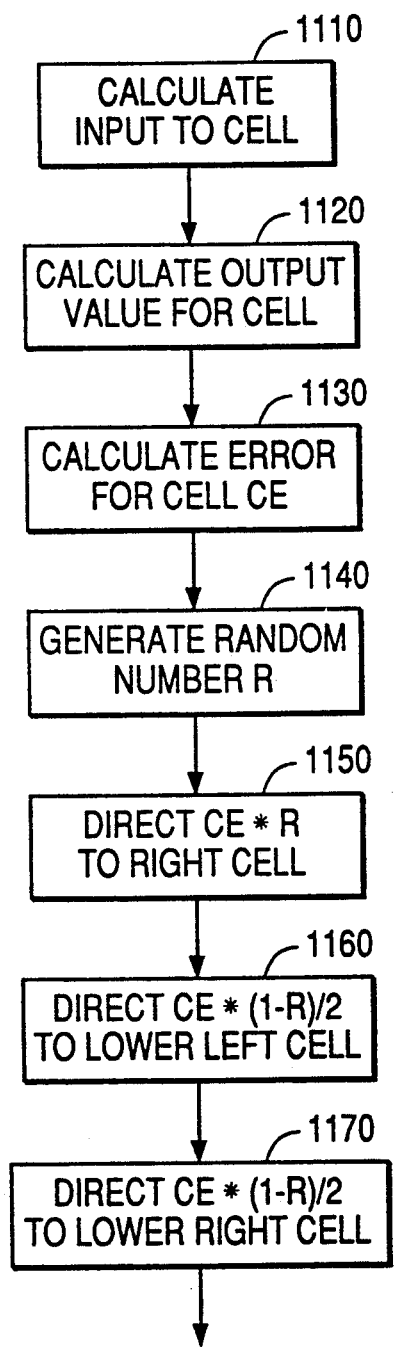
FIG. 11 is a flow diagram corresponding to another step of FIG. 9.
Figure 12:
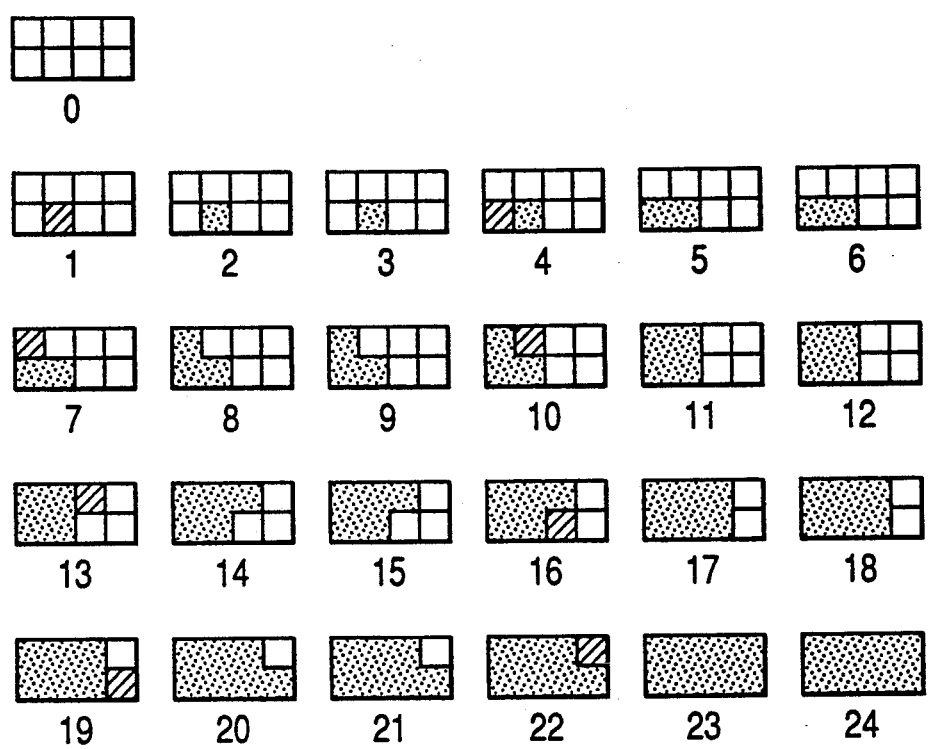
FIG. 12 is a diagram of dot patterns corresponding to calibrated gray levels according to the preferred embodiment of the invention.

FIG. 11 shows the processing of step 975 in FIG. 9 in detail. Before proceeding to the processing of subsequent cells, an error for the current cell is calculated and an error term for unprocessed neighboring cells is updated. First, an input value for the cell is calculated by summing the sums calculated in step 1010, the pixel input intensity values with the error terms for all the pixels in the cell, and dividing this sum of sums by the number of pixels in a cell (step 1110). An output value for the cell is calculated by summing the applied output values applied in steps 1030, 1050, 1070 and 1080 and using the sum of the applied output values to provide an index value for a calibrated gray level sequence (step 1120). FIG. 12 illustrates a gray level sequence, which is the average gray level of each of the dot patterns in FIG. 12, or equivalently the 24 threshold values in FIG. 8 sorted in descending order and indexed from 1 to 24. The calibrated gray level indexed by 0 is 255.

The error for the cell is calculated by calculating the difference between the input value for the cell and the output value for the cell (step 1130).

Figure 13:
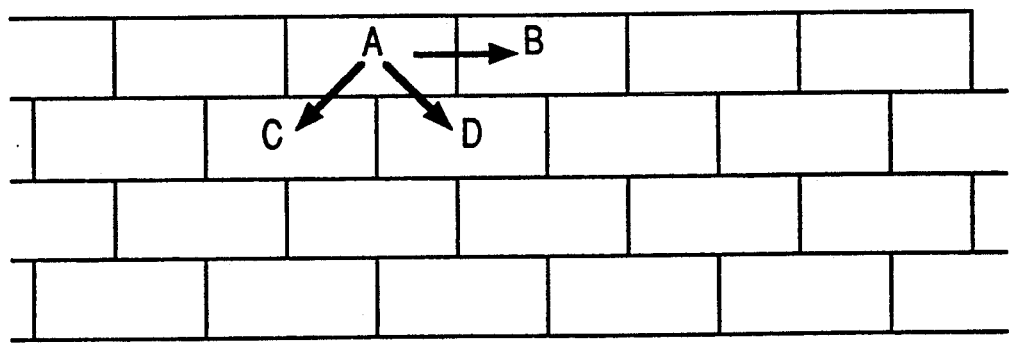
FIG. 13 is an illustration of error propagation between a currently processed cell and neighboring unprocessed cells according to the preferred embodiment of the present invention.

FIG. 13 illustrates the propagation of the calculated error into neighboring unprocessed cells.

A random number R, uniformly distributed between 0 and 0.5, is generated (step 1140). An amount of error equal to the product of the calculated error and R is directed to the cell on the right of the cell being currently processed, cell B (step 1150). An amount of error equal to the product of the calculated error and (1-R)/2 is directed to the cell below and left of the cell being currently processed, cell C (step 1160), and an amount of error equal to the product of the calculated error and (1-R)/2 is directed to the cell below and right of the cell being currently processed, cell D (step 1170).

It can be seen that in the preferred embodiment most cells in the input image will have error directed to them from the processing of multiple previous cells. For example in FIG. 13, cell D is shown as having error directed to it from the processing of cell A. When cell B is processed cell D will have error directed to it from cell B, as cell D is the lower left cell of cell B. Similarly cell D will have error directed to it from the processing of cell C, as cell D is the right cell to cell C. Assuming that the directed errors were kept in a matrix called "ERROR_TERM" the following 3 lines of code correspond to the steps 1150, 1160, and 1170 in FIG. 11, respectively:

ERROR_TERM(B)←ERROR_TERM(B)-+CE*R

ERROR_TERM(C)←ERROR_TERM(C)-+CE*(1−R)/2

ERROR_TERM (D)←CE*(1−R)/2.

Thus, the system for printing an image according to the preferred embodiment of the invention provides for enhancement of the number of perceived gray levels while preserving spatial resolution. Further, image microstructures such as edges tend to be preserved without requiring a rearrangement of pixels in a halftone cell during processing.

CONCLUSION

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicants, general inventive concept. For example, although a four level system has been shown and described herein, other levels (i.e., three levels, five levels, six levels, etc.) may be contemplated. In general, the number of threshold arrays will be one less than the number of levels.

Further, the reproduction system need not be a developable latent image reproduction system, and may be some other system for reproducing gray levels. One possibility is a direct electrostatic deposition system where the level of gray would be determined by the width and the amount of time that an electrostatic shutter is open instead of the intensity of a laser.

Thus, it will be further will be apparent to those skilled in the art that various modifications and variations can be made to the instant invention without departing from the scope or spirit of the invention, and it is intended that the present invention cover the modifications and variations provided they come within the scope of the appended claims and their equivalents.

What is claimed is:

1. In an image processing system having an input section for generating input image data having multiple input pixels, each input pixel having an input intensity value, being one of a set of input intensity values corresponding to an intensity of a sampled area of an image, and an output section for reproducing each input pixel by generating one of an output set of intensity values, a size of the output set of intensity values being OI, OI being at least 3, and a size of the input set of intensity values being larger than OI, a method of processing data generated by the input section in accordance with (OI−1) threshold arrays comprising the steps performed by a processor of:

partitioning the input image data into cells having a number of pixels, each cell having dimensions corresponding to dimensions of the threshold arrays and each pixel of each cell corresponding to one threshold in each of the threshold arrays;

processing each cell including first substeps of
  processing each pixel of a cell, including second substeps performed for each pixel in a cell, of
   comparing a sum of the pixel input intensity value and an error directed to the cell during the processing of previous cells with a corresponding threshold in a first threshold array;
   generating an output intensity value corresponding to a first value of the set of output intensity values when the sum is greater than the corresponding threshold in the first threshold array;
   comparing the sum with a corresponding threshold in a second threshold array;
   generating an output intensity value corresponding to a second value of the set of output intensity values when the sum is greater than the corresponding threshold in the second threshold array and not greater than the corresponding threshold in the first threshold array; and
   generating an output intensity value corresponding to an OIth value of the set of output intensity values when the sum is not greater than the corresponding thresholds in all of the threshold arrays;
  applying the output intensity value to the output section;
 calculating an error for the cell; and
 directing an amount of the error to a set of unprocessed neighboring cells including third subsets of
  determining a set of fractions, one for each of the set of unprocessed neighboring cells, the sum of the set of fractions being substantially equal to one; and
  directing an amount of the error equal to a product of the calculated error and one of the set of fractions to an unprocessed neighboring cell.

2. The method of claim 1, wherein the calculating step includes the substeps of
 summing the sums of each pixel input intensity value and the error directed to the cell to produce a first value;
 dividing the first value by the number of pixels in a cell to produce a second value; and
 summing the output intensity value of each pixel to produce a third value.

3. The method of claim 2, wherein the calculating step further includes the substeps of
 indexing a level sequence using the third value to produce a fourth value; and
 determining an arithmetic difference between the fourth value and the second value.

4. The method of claim 2, wherein the calculating step further includes the substeps of
 indexing a calibrated level sequence using the third value to produce a fourth value; and
 determining an arithmetic difference between the fourth value and the second value.

5. In an image processing system having an input section for generating input image data having multiple input pixels, each input pixel having an input intensity value, being one of a set of input intensity values corresponding to an intensity of a sampled area of an image, and an output section for reproducing each input pixel by generating one of an output set of intensity values, a size of the output set of intensity values being OI, OI being at least 3, and a size of the input set of intensity values being larger than OI, a method of processing data generated by the input section in accordance with a (OI−1) threshold arrays comprising the steps performed by a processor of:

partitioning the input image data into a number of rows of cells having a number of pixels, each cell having dimensions corresponding to dimensions of the threshold arrays and each pixel of each cell corresponding to one threshold in each of the threshold arrays, partition boundaries being aligned such that odd numbered rows of cells are offset, along an axis of the image, with respect to even numbered rows of cells by half a cell width;

processing each cell including first substeps of
  processing each pixel of a cell, including second substeps performed for each pixel in a cell, of
   comparing a sum of the pixel input intensity value and an error directed to the cell during the processing of previous cells with a corresponding threshold in a first threshold array;
   generating an output intensity value corresponding to a first value of the set of output intensity values when the sum is greater than the corresponding threshold in the first threshold array;
   comparing the sum with a corresponding threshold in a second threshold array;
   generating an output intensity value corresponding to a second value of the set of output intensity values when the sum is greater than the corresponding threshold in the second threshold array and not greater than the corresponding threshold in the first threshold array; and
   generating an output intensity value corresponding to an OIth value of the set of output intensity values when the sum is not greater than the corresponding thresholds in all of the threshold arrays; and
  applying the output intensity value to the output section;
 calculating an error for the cell; and
 directing an amount of the error to a set of unprocessed neighboring cells including third substeps of
  determining first, second, and third fractions, the sum of the set of fractions being substantially equal to one;
  directing an amount of the error equal to a product of the calculated error and the first fraction to a first neighboring cell;
  directing an amount of the error equal to a product of the calculated error and the second fraction to a second neighboring cell; and directing an amount of the error equal to a product of the calculated error and the third fraction to a third neighboring cell.

6. The method according to claim 5, wherein the step of determining the first, second, and third fractions includes the substeps of generating a random number R uniformly distributed between 0 and 0.5;

determining the first fraction to be the R;

determining the second fraction to be $(1-R)/2$; and determining the third fraction to be $(1-R)/2$.

7. The method of claim 5, wherein the calculating step includes the substeps of summing the sums of each pixel input intensity value and the error directed to the cell to produce a first value;

dividing the first value by the number of pixels in a cell to produce a second value; and summing the output intensity value of each pixel to produce a third value.

8. The method of claim 7, wherein the calculating step further includes the substeps of indexing a level sequence using the third value to produce a fourth value; and determining an arithmetic difference between the fourth value and the second value.

9. The method of claim 7, wherein the calculating step further includes the substeps of indexing a calibrated level sequence using the third value to produce a fourth value; and determining an arithmetic difference between the fourth value and the second value.

* * * * *